US008935877B2

(12) United States Patent
Götschi

(10) Patent No.: US 8,935,877 B2
(45) Date of Patent: Jan. 20, 2015

(54) APPARATUS FOR COMBATTING OR TRAPPING NOCTURNAL INSECTS

(76) Inventor: Rudolf Götschi, Brislach (CH)

( * ) Notice: Subject to any disclaimer, the term of this patent is extended or adjusted under 35 U.S.C. 154(b) by 636 days.

(21) Appl. No.: 12/376,617

(22) PCT Filed: Aug. 8, 2007

(86) PCT No.: PCT/CH2007/000386
§ 371 (c)(1),
(2), (4) Date: Feb. 17, 2009

(87) PCT Pub. No.: WO2008/017185
PCT Pub. Date: Feb. 14, 2008

(65) Prior Publication Data
US 2010/0175307 A1 Jul. 15, 2010

(30) Foreign Application Priority Data

Aug. 8, 2006 (CH) .......................................... 126/06
Nov. 5, 2006 (CH) .......................................... 1747/06
Apr. 20, 2007 (CH) .......................................... 659/07

(51) Int. Cl.
*A01M 3/04* (2006.01)
*A01M 3/00* (2006.01)
*A01M 1/04* (2006.01)
*A01M 1/14* (2006.01)

(52) U.S. Cl.
CPC ...................................... *A01M 3/04* (2013.01)
USPC .................... 43/136; 43/134; 43/113; 43/114

(58) Field of Classification Search
USPC ................... 43/113, 114, 133, 134, 136, 17.5; 362/197–199, 187–189, 277, 278, 282, 362/217.02
See application file for complete search history.

(56) References Cited

U.S. PATENT DOCUMENTS

| | | | | | |
|---|---|---|---|---|---|
| 229,230 | A | * | 6/1880 | Anderson | 43/134 |
| 550,345 | A | * | 11/1895 | Humphreys et al. | 43/113 |
| 670,996 | A | * | 4/1901 | Morgan | 43/113 |
| 970,784 | A | * | 9/1910 | Bohm | 43/113 |
| 979,640 | A | * | 12/1910 | Boerngen | 43/136 |
| 1,132,141 | A | * | 3/1915 | Wilson | 43/136 |
| 1,190,165 | A | * | 7/1916 | Hemenway | 43/136 |
| 1,461,169 | A | * | 7/1923 | Wilson | 43/113 |
| 1,750,163 | A | * | 3/1930 | Disney | 43/134 |
| 1,802,774 | A | * | 4/1931 | Nixon | 43/136 |
| 1,888,563 | A | * | 11/1932 | Nixon | 43/136 |
| 2,962,836 | A | * | 12/1960 | Hughes | 43/114 |
| 3,330,063 | A | * | 7/1967 | Lockwood | 43/134 |
| 3,449,856 | A | * | 6/1969 | Weaver | 43/136 |
| 4,052,811 | A | * | 10/1977 | Shuster et al. | 43/136 |
| 4,126,959 | A | * | 11/1978 | Graham | 43/136 |

(Continued)

FOREIGN PATENT DOCUMENTS

| | | | | |
|---|---|---|---|---|
| CH | 260495 | | 3/1949 | |
| DE | 19636247 A1 | * | 3/1998 | A01M 3/00 |

(Continued)

*Primary Examiner* — Darren W Ark
(74) *Attorney, Agent, or Firm* — Hammer & Associates, P.C.

(57) ABSTRACT

The apparatus for disposing of individual nocturnal insects sitting on a base or for trapping them comprises a portable lamp (1) and a translucent attachment (2), which is arranged at the light exit of the lamp (1) and can preferably move relative thereto, with a means (11) for preventing the insect from escaping.

6 Claims, 3 Drawing Sheets

(56) References Cited

U.S. PATENT DOCUMENTS

| | | | |
|---|---|---|---|
| 4,411,093 A * | 10/1983 | Stout et al. | 43/114 |
| 4,450,649 A * | 5/1984 | Dunwoody | 43/136 |
| 4,817,330 A * | 4/1989 | Fahringer | 43/136 |
| 4,914,855 A * | 4/1990 | Sherman | 43/136 |
| 4,918,856 A * | 4/1990 | Olive et al. | 43/113 |
| 5,029,411 A * | 7/1991 | Keenan | 43/136 |
| 5,095,648 A * | 3/1992 | Keenan | 43/136 |
| 5,203,816 A * | 4/1993 | Townsend | 43/114 |
| 5,231,790 A * | 8/1993 | Dryden et al. | 43/113 |
| 5,305,546 A * | 4/1994 | Edwards | 43/134 |
| 5,311,696 A * | 5/1994 | Gauthier et al. | 43/113 |
| 5,311,697 A * | 5/1994 | Cavanaugh et al. | 43/113 |
| 5,353,542 A * | 10/1994 | Vaudry | 43/113 |
| 5,402,598 A * | 4/1995 | Wade et al. | 43/134 |
| 5,628,142 A * | 5/1997 | Kitterman et al. | 43/136 |
| 6,044,584 A * | 4/2000 | Lynn | 43/136 |
| 6,108,966 A * | 8/2000 | Otomo et al. | 43/113 |
| 6,155,002 A * | 12/2000 | Holder | 43/114 |
| 6,185,862 B1 * | 2/2001 | Nelson | 43/136 |
| 6,393,759 B1 * | 5/2002 | Brown et al. | 43/113 |
| 6,560,919 B2 * | 5/2003 | Burrows et al. | 43/113 |
| 6,758,009 B1 * | 7/2004 | Warner | 43/113 |
| 7,065,919 B1 * | 6/2006 | Vierra | 43/136 |
| 7,165,355 B2 * | 1/2007 | George et al. | 43/136 |
| 7,469,501 B1 * | 12/2008 | Blum | 43/136 |
| 2003/0024151 A1 * | 2/2003 | Kremer | 43/136 |
| 2006/0248783 A1 * | 11/2006 | Lindquist et al. | 43/113 |
| 2007/0039234 A1 * | 2/2007 | Reime | 43/113 |
| 2008/0034643 A1 * | 2/2008 | Chen | 43/113 |
| 2008/0040967 A1 * | 2/2008 | Young | 43/136 |
| 2010/0058645 A1 * | 3/2010 | Reime | 43/113 |

FOREIGN PATENT DOCUMENTS

| | | | | |
|---|---|---|---|---|
| EP | 1034700 A1 * | 9/2000 | | A01M 1/04 |
| EP | 1138199 A2 * | 10/2001 | | A01M 1/04 |
| EP | 1203530 A1 * | 5/2002 | | A01M 1/04 |
| GB | 2155300 A * | 9/1985 | | A01M 3/04 |
| GB | 2258991 A * | 3/1993 | | A01M 3/00 |
| JP | 04053438 A * | 2/1992 | | A01M 3/00 |
| JP | 06209685 A * | 8/1994 | | A01M 3/04 |
| JP | 08-047361 | 2/1996 | | |
| JP | 09275873 A * | 10/1997 | | A01M 3/04 |
| JP | 09294522 A * | 11/1997 | | A01M 3/04 |
| JP | 2003009745 A * | 1/2003 | | A01M 1/14 |
| JP | 2003199471 A * | 7/2003 | | A01M 1/04 |
| JP | 2003310130 A * | 11/2003 | | A01M 3/00 |
| JP | 2003346506 A * | 12/2003 | | A01M 1/04 |
| JP | 2004105122 A * | 4/2004 | | A01M 1/04 |
| JP | 2004248646 A * | 9/2004 | | A01M 3/04 |
| JP | 2004261106 A * | 9/2004 | | A01M 1/14 |
| JP | 2007135576 A * | 6/2007 | | A01M 3/04 |
| JP | 2008022833 A * | 2/2008 | | A01M 1/04 |
| JP | 2009218019 A * | 9/2009 | | A01M 1/04 |
| WO | WO 2005032248 A1 * | 4/2005 | | A01M 3/02 |
| WO | WO 2010015884 A1 * | 2/2010 | | A01M 3/02 |

\* cited by examiner

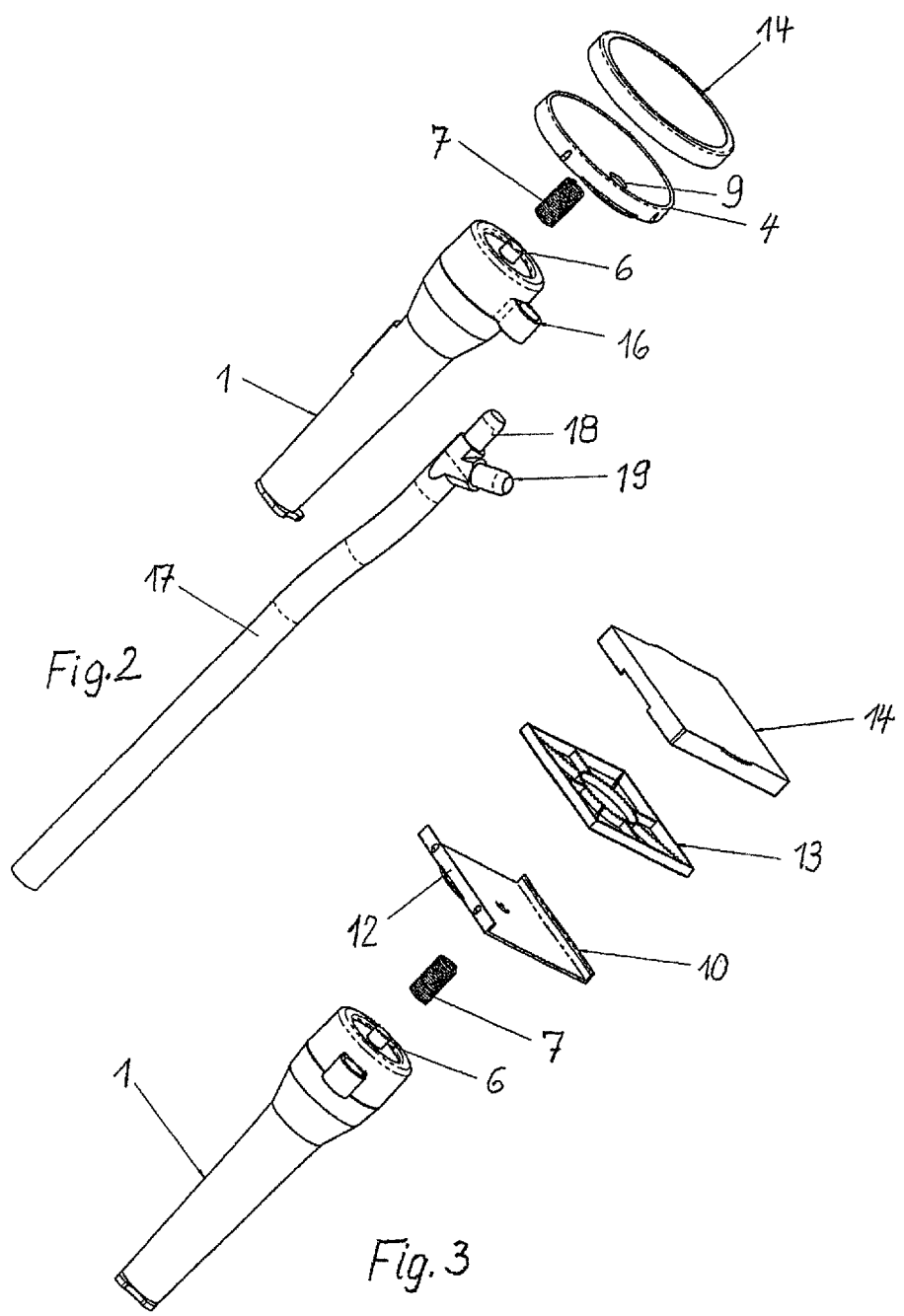

APPARATUS FOR COMBATTING OR TRAPPING NOCTURNAL INSECTS

The invention relates to a device for rendering harmless or trapping individual nocturnal insects located on a surface.

The fact that nocturnal insects fly towards light sources, is part of general experience. Given that insects have a natural phototropic tendency, they fly towards any light source, such as electric light, candles, open fires. Any visible light source implies an open flight path for these insects.

For egg maturation, the female mosquitos require blood from birds, mammals or even humans. They use visual, thermal and olfactory indicators in order to find suitable prey for a blood meal.

As they do on leaves in the open air, the female mosquitos sit quietly on walls, ceilings and appliances in living spaces, preferably when the light is switched off. If they remain undisturbed in the dark room for a while, they approach their victim in order to suck blood. If they are disturbed in this activity, they generally rapidly settle in the vicinity of the victim in the dark room, where they once again sit quietly and wait.

Numerous methods exist in order to prevent mosquitos from entering living spaces. Frequently, insecticides are used but this is controversial. Once they are inside, however, it is important to render them harmless quickly. Fly swats or textiles are used to strike or throw against the mosquitos. This practice is laborious and requires a great deal of skill and above all accuracy of aim. Additionally, by squashing the mosquitos, remains and even specks of blood are produced on walls, ceilings and appliances. The many drawbacks of such a pursuit are generally known.

The general object of the invention is to avoid the above-mentioned drawbacks and to provide improvements. In particular, the invention aims to provide a simple, cost-effective and environmentally friendly device by means of which mosquitos which have entered living spaces are specifically rendered harmless and other nocturnal insects may be specifically trapped.

According to the invention, the object is achieved by a portable luminaire and an attachment arranged at the light outlet thereof, permitting the passage of light, comprising means for catching the insect.

Preferably, the attachment and also the means for catching the insect consist of clear material. Moreover, the attachment is preferably connected to the luminaire by means of a resilient element. Within the scope of this description, the terms luminaire and pocket torch or electric torch are used equally.

Preferred embodiments of the invention are disclosed hereinafter with reference to the accompanying drawings, in which:

FIG. 2 shows a perspective view of the arrangement shown in FIG. 1

FIG. 3 shows a perspective view of a further embodiment of the invention

Figure 1:
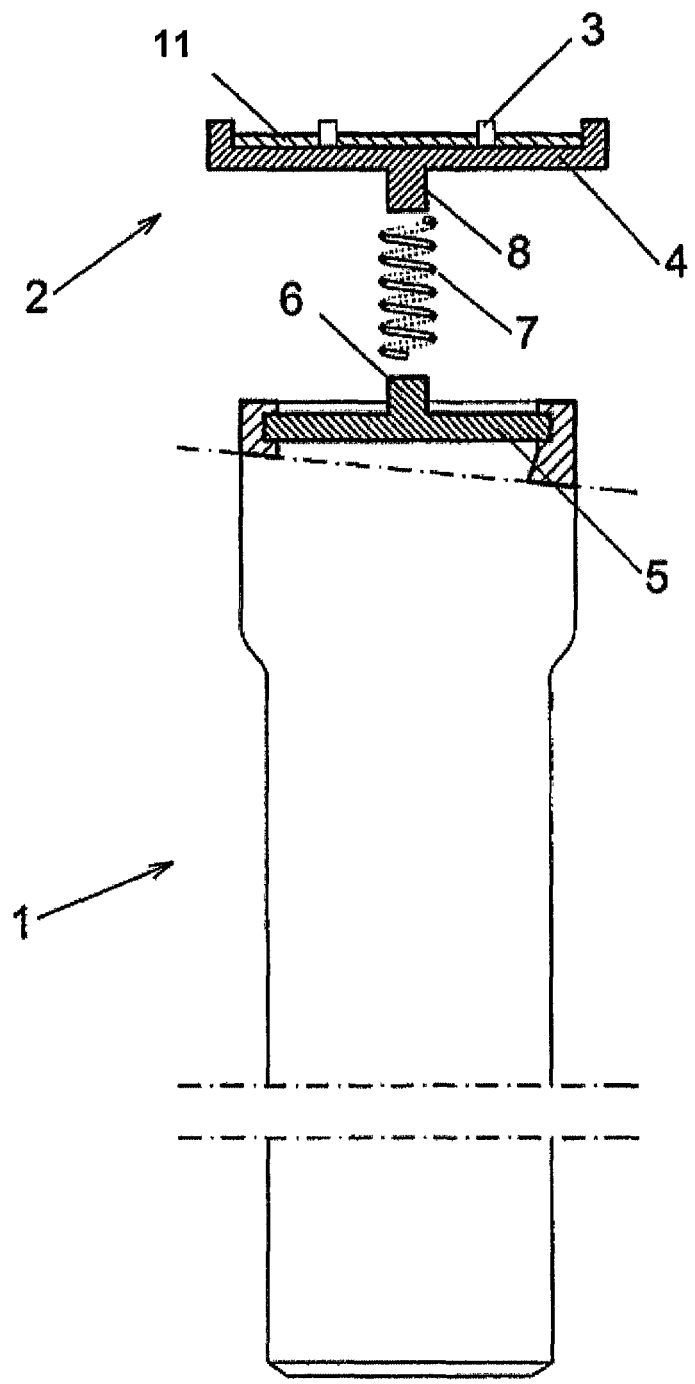
FIG. 1 shows an electric torch with an attachment for catching mosquitos in an exploded view, partially in section

The device shown in FIGS. 1 and 2 made of metal or plastics consists of an electric torch 1 designed for this purpose and an attachment 2 which is movable relative thereto in the form of a flat plate 4 provided with spacers 3, which is connected to the luminaire 1 by means of a resilient element.

In the torch 1 of this embodiment the luminaire glass 5 shown in section has a central cylindrical pin 6 oriented axially outwardly. Said pin is formed integrally on the glass and thus consists of the same material so that the light output is not impaired or not substantially impaired.

The pin is used for fastening a spiral spring 7, one end thereof being positioned on the pin. The cylindrical surface of the pin may be roughened or ribbed in order to hold the end of the spring more securely and to avoid the inadvertent removal thereof. However, even when the surface of the pin is smooth, the spring is held sufficiently rigidly.

The other end of the spring is positioned on a pin 8 of substantially the same shape, which is formed on the underside of the plate 4. As a result of the resilient connection between the luminaire glass and the plate 4, the plate may tilt in any direction relative to the luminaire axis. In this manner, the plate is always able to rest flat on a surface, such as for example a wall, etc., even when the luminaire is not held exactly perpendicular to this surface.

The plate 4 is circular and consists of a clear material in order to allow the greatest possible passage of light. The diameter of the plate 4 may be approximately the same size as that of the luminaire head, but preferably larger.

In the embodiment shown in FIG. 3, the attachment consists of a four-cornered, preferably square plate 10 provided with spacers 12, which in the same manner as in the embodiment described above is connected by means of a spring 7 to the pin 6.

With the disclosed attachment, there is a plurality of possibilities for rendering an insect harmless. A first possibility is to provide the plate 4 and/or 10 on the side remote from the luminaire with a layer 11 of transparent and/or clear fly glue for catching the mosquitos. The spacers 3 and/or 12 at the edge of the plate 4 and/or 10 are used so that the mosquito is not squashed. The spacers are dimensioned so that, when positioning the plate, a mosquito is barely touched by the glue layer. This is sufficient to render the mosquito incapable of flying. In order to prevent, moreover, the glue layer from coming into contact with the surface on which the mosquito sits, not only the edge of the plates 4 and/or 10 but the entire surface is provided with spacers. This is shown, for example, in FIG. 3. After applying the glue layer, a grid element 13 is inserted between the spacers 12 along two opposing plate edges.

In both embodiments, moreover, a cover 14 is provided which firstly protects the glue layer and secondly conceals the unpleasant view of the mosquitos already caught.

A further possibility for catching mosquitos is to provide, instead of a glue coating, a clear double-sided adhesive film, one adhesive side being used to affix the film to the plate and the other for catching the mosquitos. The plate is perforated in order to avoid air bubbles between the film and the plate. In this embodiment, the spacers are flatter, so that when positioning the plate a light pressure is exerted on the insect in order to ensure that the insect adheres thereto. An advantage with this version is that the adhesive film may be removed and replaced by a new film, when it has become unsightly by a plurality of insects which have been caught. In order to facilitate the removal of the film, at the edge of the plate a larger through-hole 9 is provided through which one side of the film may be pushed away from the plate by a suitable object, for example a ballpoint pen, etc.

If it is only a case of bruising the mosquitos, the adhesive layers may be dispensed with. Even in this embodiment spacers are provided, so that the insect is not completely squashed against the wall. The spacers, however, are even more flat than in the version with the adhesive film.

Instead of forming the pin 6 on the luminaire glass, it may also be attached to an attachment.

The pins may also have a square cross section, so that the inner faces of the spring only rest against the edges of the pins. The edges may have a recess at their ends, at which they merge with the respective plate. When the two terminal windings of the spring are configured with a slightly smaller diameter than the other windings, when pushing the spring onto the pins these terminal windings are widened and then engage in the recess of the edges.

According to a further embodiment, recesses may also be inserted in the surfaces which face one another of the attachment part and the plate, in which the ends of the spring used for the resilient connection are fastened.

Instead of a spiral spring, other resilient elements may also be used, such as for example a spring steel wire, which is inserted in suitable bores of the two resiliently connected parts, or a deformable plastics neck. In luminaires with a small head diameter, such as for example LED luminaires, a spiral spring may be designed such that its one end may be slipped over the luminaire head.

Both embodiments according to FIGS. 1-3 are provided with a receiver part 16 for an extension, by means of which mosquitos may also be caught at high or otherwise very inaccessible parts of a room. An extension rod 17 may be inserted in the receiver part 16. The receiver part 16 consists of a tubular part attached in an axially parallel manner to the outer face of the luminaire housing or the attachment part. The extension rod is inserted in this tubular part. The extension rod has two pins suitable for insertion and namely an axially parallel pin 18 and a pin 19 located at an angle of, for example, 45° thereto. Instead of a tubular part, a pin may also be provided on the housing, onto which the tubular ends of the extension rod may be positioned.

Figure 4:
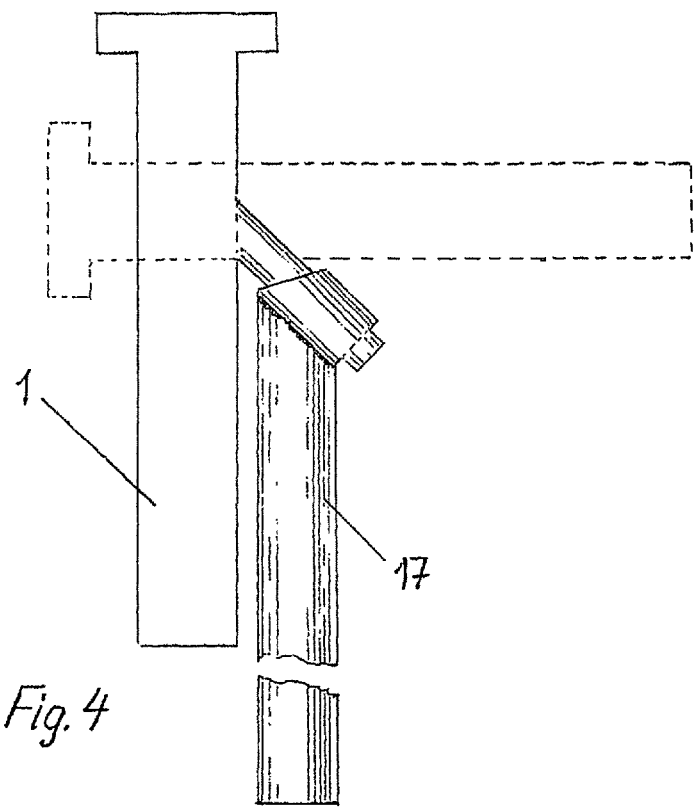
FIG. 4 shows a variant of the extension device shown in FIG. 3

Instead of the axially parallel direction, as shown in FIG. 4, the receiver part may also be arranged at an angle to the axis, preferably at 45°. The receiver part is itself attached to the luminaire housing. Alternatively, it is possible to attach the receiver part to a ring surrounding the luminaire housing and securing said luminaire housing. If the end of the extension rod inserted into the receiver part also forms an angle of, for example, 45° with the rod axis, the luminaire may adopt any angle relative to the extension rod.

The extension rod 17 is a one-piece rod or a tube made of metal, plastics or the like. Alternatively, the extension rod may also consist of individual parts which may be fitted together or a rod which may be pushed together in a telescopic manner.

A further possibility for catching insects is a block which comprises a plurality of sheets of clear films being affixed, each individual film thereof being provided with a coating of a non-hardening adhesive, similar to that which is used, for example, for note blocks known by the brand name "Post-it". In contrast to the note blocks, the individual sheets of the block are provided on their upper face and namely on the greatest part of their surface with adhesive and only in a small edge region without adhesive. This edge region is used for grasping the individual sheet.

The number of sheets of a block is selected so that the light penetration through the base plate and the block is still sufficient to locate the targeted insect in the light beam. For catching the insect, as in the other embodiments, the luminaire provided with the device according to the invention is brought closer to the insect until it is touched by the adhesive layer and remains adhered thereto. After an insect or a plurality thereof adhere to the uppermost sheet of the block, the sheet may be simply removed and disposed of. Thus a new sheet is made available for the next use.

When all the sheets of the block are used up, the device may still be used with the glue which is used for affixing the block. The last sheet of the block may, instead, be a double-sided adhesive film which secures the block.

A further possibility for making mosquitos and other troublesome insects harmless is to provide the plate 4 and/or 10 with means for applying an electrical voltage. To this end, wires or conductors are distributed over the plate.

Figure 5:
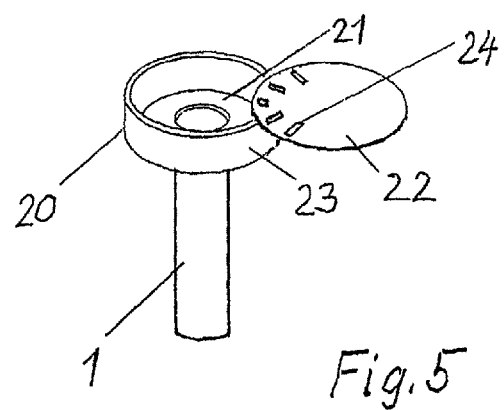
FIG. 5 shows an embodiment for trapping an insect

The device shown schematically in FIG. 5 is used for trapping insects, without damaging them. A housing 20 comprising an opening or a transparent region in the base 21 is positioned on a luminaire or connected thereto, for example also in a similar manner to the plates 4 and/or 10. A pivotable cover 22 without a rim, made of flat transparent material, is attached to the housing 20 on the side which opposes the base 21. The pivot axis of the cover is located in the side wall 23 or in the vicinity thereof on the inside or outside, and is enclosed by a thick-walled tubular guide, on which the cover rests. In this manner, the cover is positioned such that when the cover 22 is pivoted outwards by 180°, the housing is optimally open. The cover is partially provided on its external circular surface with a rubber-like coating or with small rubber-like raised portions 24. The housing, which is open and positioned on a surface, is closed by being pivoted toward the cover 22. As a result of the rubber-like or soft coating 24 and the pressing power against the surface, therefore, the cover remains adhered to the surface. Thus single-handed operation of the device is possible, even when using an extension. The device may also be used during daylight without light passing through.

The invention claimed is:

1. A device for combating or trapping individual nocturnal insects sitting on a surface comprising:
   a flashlight,
   an attachment arranged at a light outlet of the flashlight with means for catching the insects, the attachment comprising a transparent plate arranged in front of the light outlet and extending across an emitted light beam of the flashlight, and
   a resilient connecting element connecting the plate to the flashlight, the connecting element enabling the plate to tilt in any and all directions relative to the flashlight,
   wherein the means for catching the insects consists of a block made of sheets coated with glue.

2. The device according to claim 1, characterised in that the means for catching the insects is a replaceable part which may be inserted into the attachment.

3. The device according to claim 1, characterised in that an extension is provided which may be connected to the flashlight or to the attachment.

4. A device for combating or trapping individual nocturnal insects sitting on a surface comprising:
   a flashlight,
   an attachment arranged at a light outlet of the flashlight with a means for catching the insects, the attachment comprising a transparent plate arranged in front of the light outlet and extending across an emitted light beam of the flashlight, and
   a resilient connecting element connecting the plate to the flashlight, the connecting element enabling the plate to tilt in any and all directions relative to the flashlight,
   wherein the resilient connecting element is a spiral spring with one end being positioned on a pin attached to the flashlight and with another end being positioned on a pin attached to the attachment.

5. The device according to claim 4, characterised in that the means for catching the insects is a replaceable part which may be inserted into the attachment.

6. The device according to claim 4, characterised in that an extension is provided which may be connected to the flashlight or to the attachment.

* * * * *